United States Patent [19]
Dubedout et al.

[11] Patent Number: 5,172,548
[45] Date of Patent: Dec. 22, 1992

[54] DEVICE FOR TAPPING OFF HOT GASES FROM A COMBUSTION CHAMBER AND INJECTOR HEAD EQUIPPED WITH SUCH A DEVICE

[75] Inventors: Antoine Dubedout, Montargis; René Morel, Pacy-Sur-Eure, both of France

[73] Assignee: Societe Europeenne De Propulsion, France

[21] Appl. No.: 751,592

[22] Filed: Aug. 21, 1991

Related U.S. Application Data

[63] Continuation of Ser. No. 403,472, Sep. 6, 1989, abandoned.

[30] Foreign Application Priority Data

Sep. 14, 1988 [FR] France ................... 88 11999

[51] Int. Cl.[5] ............... F02K 9/60; F02K 11/00
[52] U.S. Cl. ............................. 60/258; 60/265
[58] Field of Search ............... 60/257, 258, 259, 260, 60/265

[56] References Cited

U.S. PATENT DOCUMENTS

| | | | |
|---|---|---|---|
| 3,127,738 | 4/1964 | Hasbrouck | 60/35.6 |
| 3,134,224 | 5/1964 | Lippincott | 60/35.6 |
| 4,621,492 | 11/1986 | von Pragenau | 60/258 |

FOREIGN PATENT DOCUMENTS

| | | |
|---|---|---|
| 2498946 | 11/1940 | France . |
| 2570129 | 9/1985 | France . |
| 1565785 | 5/1989 | France . |

*Primary Examiner*—Richard A. Bertsch
*Assistant Examiner*—Timothy S. Thorpe
*Attorney, Agent, or Firm*—Staas & Halsey

[57] ABSTRACT

A device for tapping off hot gases in a combustion chamber into which arrive a plurality of injectors has a tap-off means intended for conveying gases tapped off from the combustion chamber to an additional cavity. The tap-off means is formed of at least one tubular element having, in the region of its end opposite the combustion chamber a nozzle for individual adjustment of the flow of gases tapped off. A number of tap-off devices can be incorporated in an injector head comprising several injectors. The tap-off means comprises a cooling system using one of the cold propellants.

21 Claims, 8 Drawing Sheets

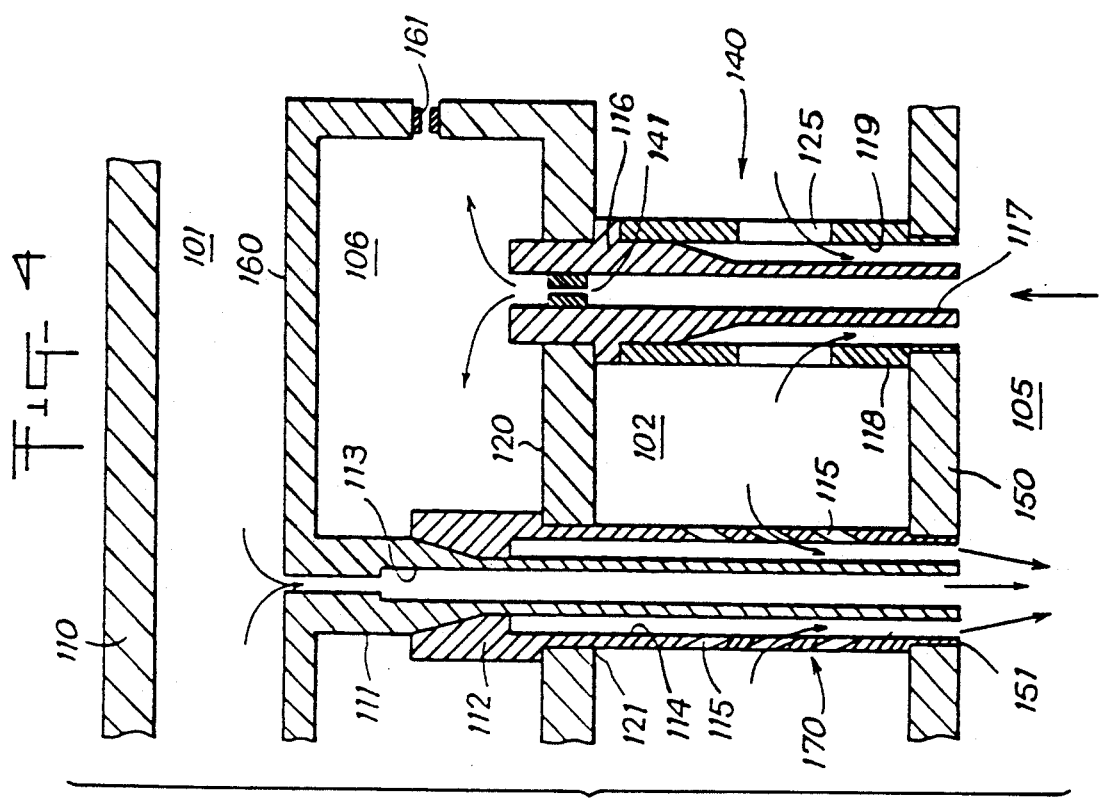
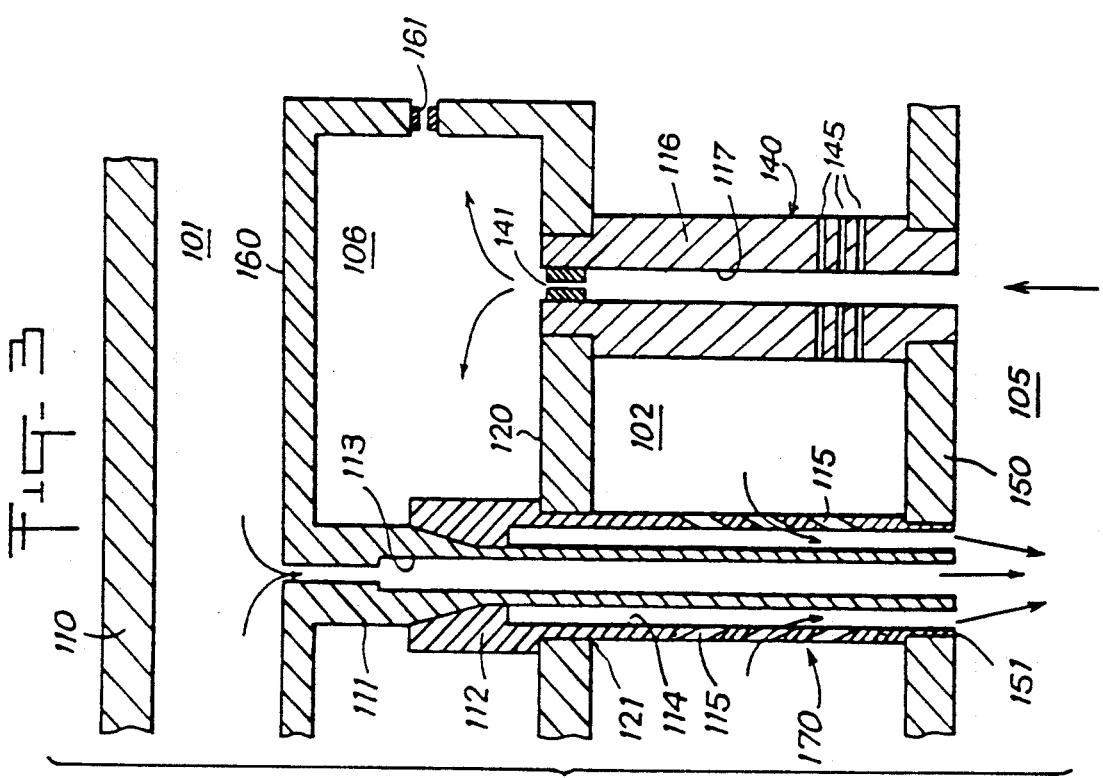

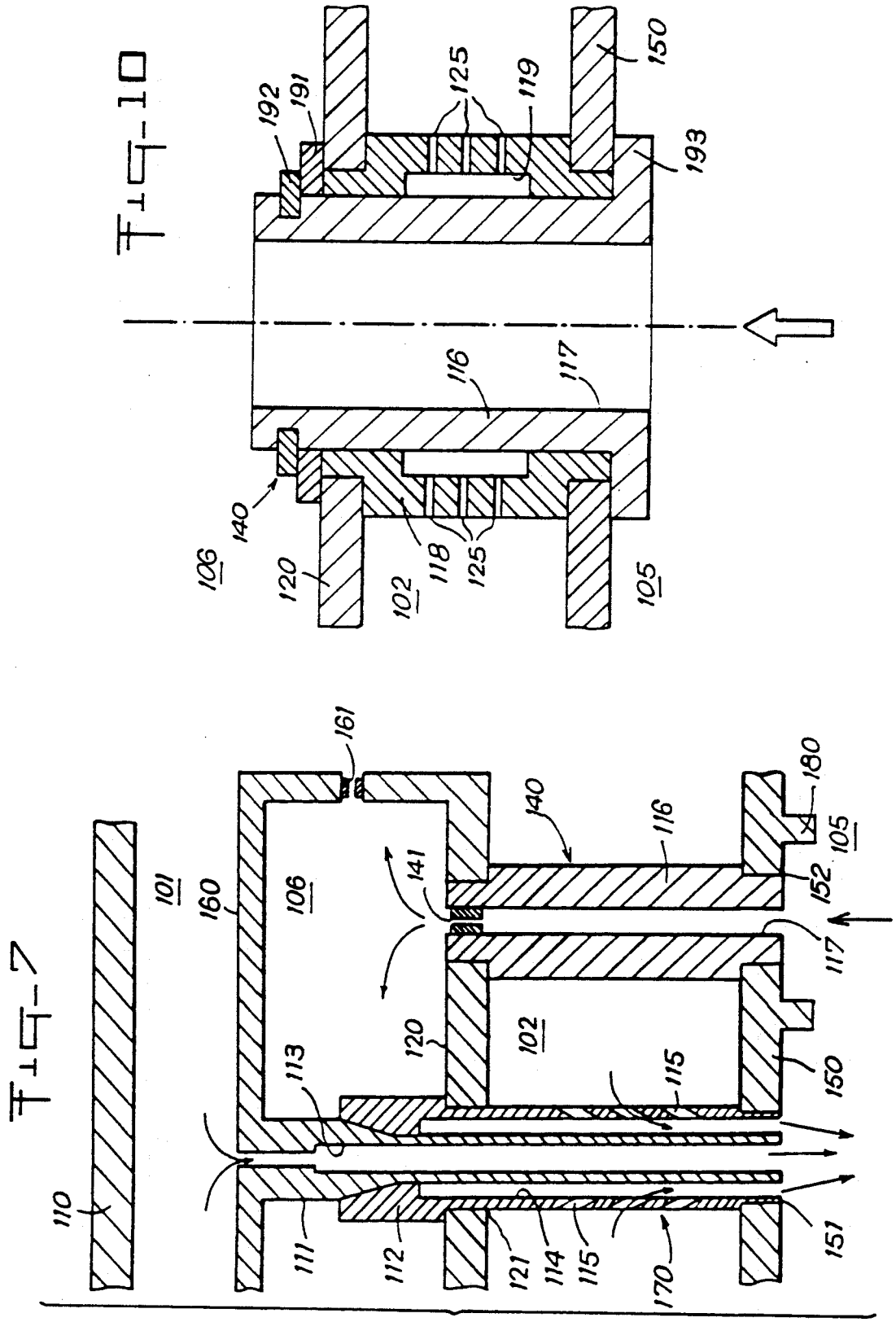

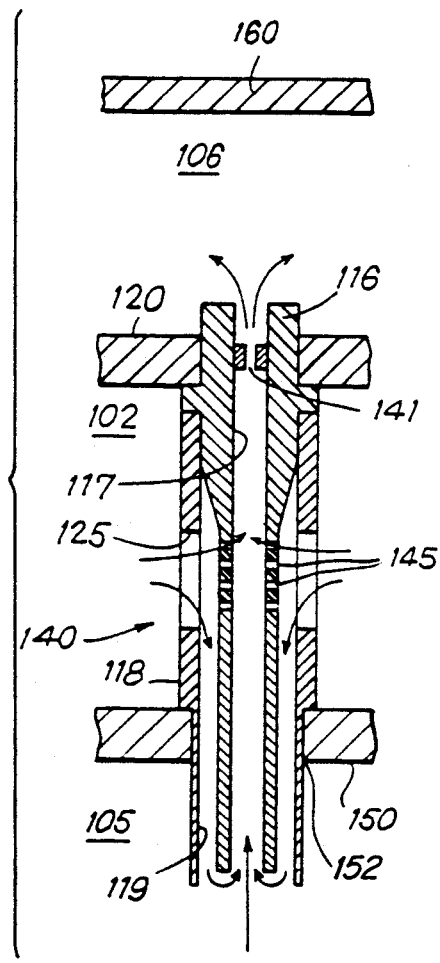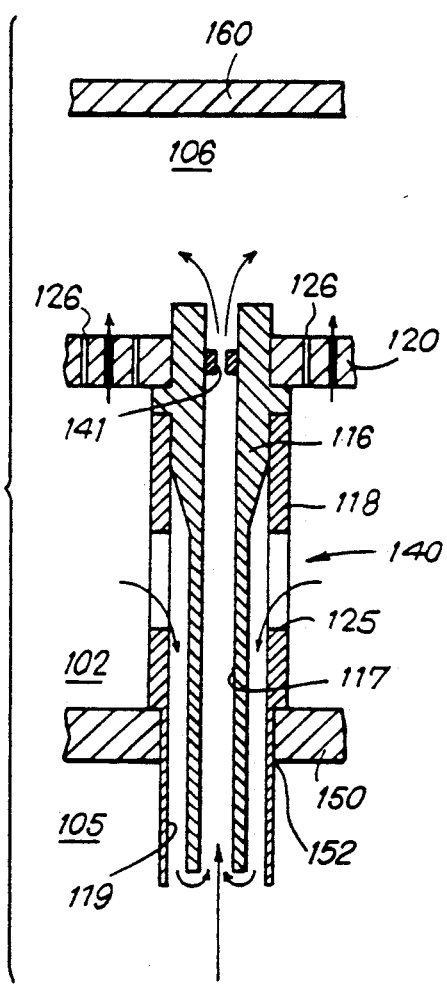

DEVICE FOR TAPPING OFF HOT GASES FROM A COMBUSTION CHAMBER AND INJECTOR HEAD EQUIPPED WITH SUCH A DEVICE

This application is a continuation of application Ser. No. 403,472, filed Sep. 6, 1989, now abandoned.

FIELD OF THE INVENTION

The present invention concerns a device for tapping off hot gases from a combustion chamber, in particular from a combustion chamber for liquid propellant rocket motors, and also concerns an injector head equipped with such a device.

Although such a type of device is primarily intended for rocket motor combustion chambers, it is also applicable to gas generators for which two outgoing temperatures may be required.

BACKGROUND OF THE INVENTION

In the present state of the art there essentially exists two types of injectors located at the inlet of combustion chambers:

a first type of injection mode illustrated eg. in document FR-A-2 543 222 involves separately conveying each of two propellants required for the combustion by means of two inlet pipe systems, the channels of one system surrounding the jets of the other system.

This type of system is shown schematically in FIG. 2a. Here, one of the propellants is conveyed from a cavity 1 by a central duct 13 of a tubular injector 70, while the second propellant contained in a second cavity 2, is introduced by lateral holes 15 and travels along the annular space 14 formed by two coaxial tubular elements 11 and 12 before penetrating into the combustion chamber 5. Combustion then occurs, in a known manner, by chemical reaction between the two propellants inside the combustion chamber 5.

A second type of injection mode is employed in the so called "integrated flux" motors.

FIG. 2b shows schematically an example that is more complex than the first one and which includes three separate cavities: two cavities 1,2 for the respective propellants and a cavity 3 for hot gases.

One of the propellants is injected from the first cavity 1 simultaneously through two tubular elements 11 and 16 of two respective injectors 80,90. The other propellants is injected from the second cavity 2 through holes provided in an external tubular element 18 coaxial with tubular element 16. The second propellant is thus injected into the combustion chamber through an annular space 19 defined by coaxial tubular elements 16,18, and mixes with the first propellant transported via the central channel 17. In the case of "integrated flux" motors, a second injection occurs in the same chamber: this is the injection of a mixture of the first propellant introduced by the central channel 13 of injector 80 with the partially burnt hot gases generated by one of the two propelants in one or a plurality of prechambers feeding the cavity 3, and introduced by lateral holes 35 through the external tubular element 12 of the injector 80 to be guided across the annular space 14 defined by the tubular elements 11 and 12 towards the combustion chamber.

Document FR-A-2 570 129 shows an embodiment in which a first propellant is brought directly into the combustion chamber by a central tube, while a second propellant is brought simultaneously through an annular space, the two propellants coming from two separate cavities. According to this embodiment, a buffer chamber is further provided inside one of the two first cavities in the injector head to take in the combustion gases repulsed from the combustion chamber through a transfer channel, This third cavity is devised for damping vibrations which could occur in the gas during the combustion process within the combustion chamber. Also, small openings are formed in the wall separating the buffer chamber from the cavity containing reducing propellant so as to allow a scavenging flow to be introduced into the buffer chamber, thereby preventing reactive mixtures from forming within the latter. The buffer chambers formed in the injector head are not connected to any collector so that the combustion products that temporarily enter therein must afterwards necessarily be expulsed into the combustion chamber.

Devices for tapping off hot gases from a combustion chamber, such as those used in the J2S type rocket motors produced by the American company Rocketdyne, are also known. But these gas tapping off devices are complex and costly, and further require a special installation involving specific technologies.

SUMMARY OF THE INVENTION

The present invention aims at overcoming the above-mentioned drawbacks and provides for a device for tapping off hot gases from a combustion chamber, especially of the type used in rocket motors, in a simple and efficient way, the tapping off device being rapidly installed and of low cost.

One aim of the present invention is to make it possible to create a rocket motor without a gas generator, capable of operating according to a so-called "tap-off" cycle and featuring reduced mass and costs, while providing improved reliability over a wide range of operation conditions.

Another aim of the present invention is to provide hot gases in a simple manner to elements producing the secondary propulsion functions, or to turbopumps for propellants or to auxiliary power units which convert the energy contained within these hot gases into electrical, hydraulic or other forms of energy.

Finally, the present invention provides for the design of a gas generator supplying gas at two different temperatures.

These aims are achieved through a device for tapping off hot gases from a combustion chamber into which a plurality of injectors mounted in an injection plate open, each injector having at least an inlet channel for a propellant, the injectors delivering at least two propellants coming from two different cavities, wherein said device includes a tap-off means to convey the gases tapped from the combustion chamber into a third cavity, and wherein the said tap-off means includes a cooling system running off from one of said propellants, and wherein said tap-off means is formed by at least one tubular element having, in the region of its end opposite the combustion chamber, a nozzle for individual adjustment of the flow of the gas tapped off.

The cooling system for the tap-off means can simply involve placing the external face of the lateral wall of the tubular element into contact with one of the cold propellants.

However, the cooling system advantageously includes means for circulating one of the propellants along a part of the length of the tap-off means so as to cool the tap-off means as well as the gases tapped off.

According to a specific embodiment, the tap-off means consists of two coaxial tubular elements, the innermost one of which comprises, at its end opposite the combustion chamber, said nozzle for individual adjustment of said tapped off gas flow, while the outermost element forms a cooling tube.

In such an embodiment, the external tubular element of the tap-off means is fitted with openings to allow passage therethrough of cooling propellant into an annular space defined by said two coaxial tubular elements. The openings, which allow a flow of cooling propellant, serve to regulate the temperature of the gases tapped off.

According to a special feature of the present invention, the lateral wall of the tubular element forming the tap-off means is perforated with radial calibrated holes to allow the hot gases circulating in the tap-off means to be cooled by a predetermined amount by injection, into the flow of gases tapped off, of a flow of cold propellant with which the external face of the lateral wall of the tubular element is in contact.

Advantageously, the ends of the tap-off means penetrate into the combustion chamber, notable to serve as acoustic baffles in the said chamber, in order to limit the high frequency combustion fluctuations.

It is also possible to provide around each tap-off means a baffle which surrounds the inlet of the tap-off means on the combustion chamber side, with the baffles being unitary with an injector plate supporting the injectors and the tap-off means, thus limiting the tapping-off of incompletely burnt gases.

The invention also concerns an injector head for a combustion chamber, comprising first and second cavities containing first and second propellants, a plurality of injectors each having at least an inlet channel for one of the propellants the said injectors giving onto the said combustion chamber, characterized in that it further includes at least one tapping off device of the type defined above, to convey the gases tapped off from the combustion chamber into a third cavity, and in that the cavity into which are brought the hot tapped off gases is fitted with a gas flow adjustment element at its output, said element being in the form of a nozzle or a sonic jet.

In a specific embodiment of the present invention, passage holes for the cooling propellant are provided in the wall separating the cavity containing said propellant from the cavity into which are conveyed the gases tapped off.

BRIEF DESCRIPTION OF THE DRAWINGS

Other characteristics, advantages and details of the present invention shall become clearer from the following description made with reference to the appended drawings, given merely as an example, and in which:

FIGS. 3 to 7 are views analogous to that of FIG. 1, showing other embodiments o the tapping off device according to the invention, FIGS. 8 to 10 are cross-sectional views of the tapping off device alone according to yet other embodiments of the present invention.

A first embodiment of a system for tapping off hot gases according to the invention shall now be described with reference to FIG. 1.

DESCRIPTION OF THE PREFERRED EMBODIMENTS

The system includes, as is known in the art, an injection chamber 101 for a first propellant, an injection chamber 102 for a second propellant, as well as a series of injectors 170 each comprising two coaxial tubes 111,112 giving onto a common combustion chamber to feed the two propellants separately therein.

Figure 1:
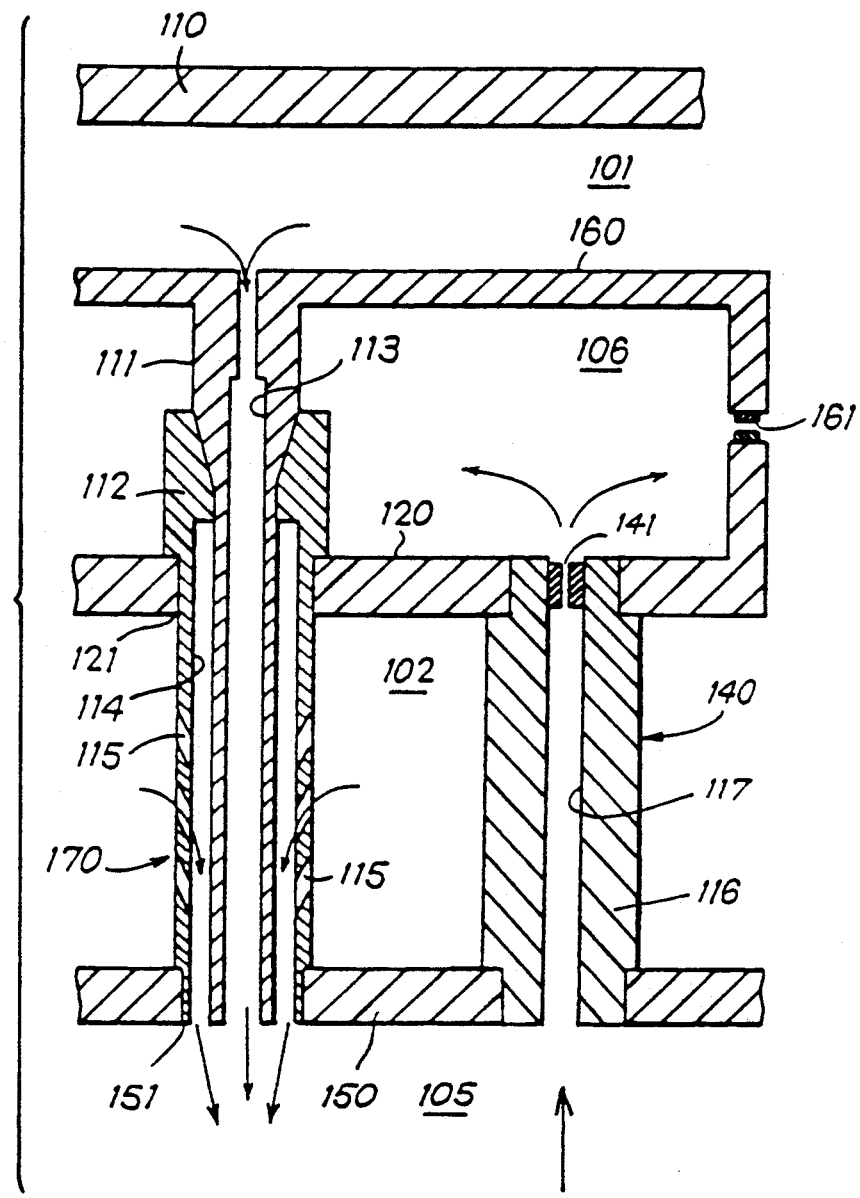
FIG. 1 is a cross-sectional view of part of the injector head fitted with a tapping off device according to the invention.

As shown in FIG. 1, an injector 170 includes a first central tube 111 defining a central conduit which stems from the chamber 101 containing the first propellant, which is preferably an oxidising propellant, and giving directly onto the combustion chamber 105. A second external tube 112 is mounted coaxially with respect to the first tube 111 and, like the latter, gives onto the combustion chamber 105, via an opening 151 in the wall 150 of the combustion chamber.

An annular space 114 is provided between the two coaxial tubes 111,112. The external coaxial tube 112 is provided with a series of openings 115 eg. having a helical form, which provide a passage for the second propellant, which is preferably a reducing propellant, from the chamber 102 to the annular space 114.

The central conduit 113 of the injector 170 extends from the level of the wall 160 which separates the chamber 101 storing the first propellant from a chamber 106 receiving the hot tapped off gases. The injector 170 extends via an opening 121 through a wall 120 which separates the chamber into which are tapped off the hot gases from the chamber 102 storing the second propellant.

An essential characteristic of the invention resides in the presence of at least one tapping off device 140 located in the region of an injector 170 and intended to tap off hot gases formed in the combustion chamber 105 and to bring them into the chamber 106, termed "tapping-off chamber" in order to provide a hot gas output at a temperature which is in principal different to that of the gases in the combustion chamber 105.

Figure 1A:
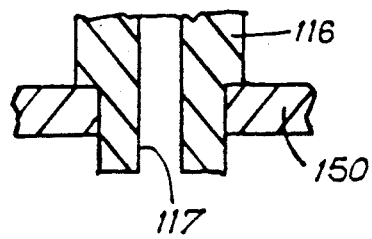
FIG. 1a is a detail from FIG. 1 showing an alternative design for the tapping off end of a tapping off device.
Figure 2B:
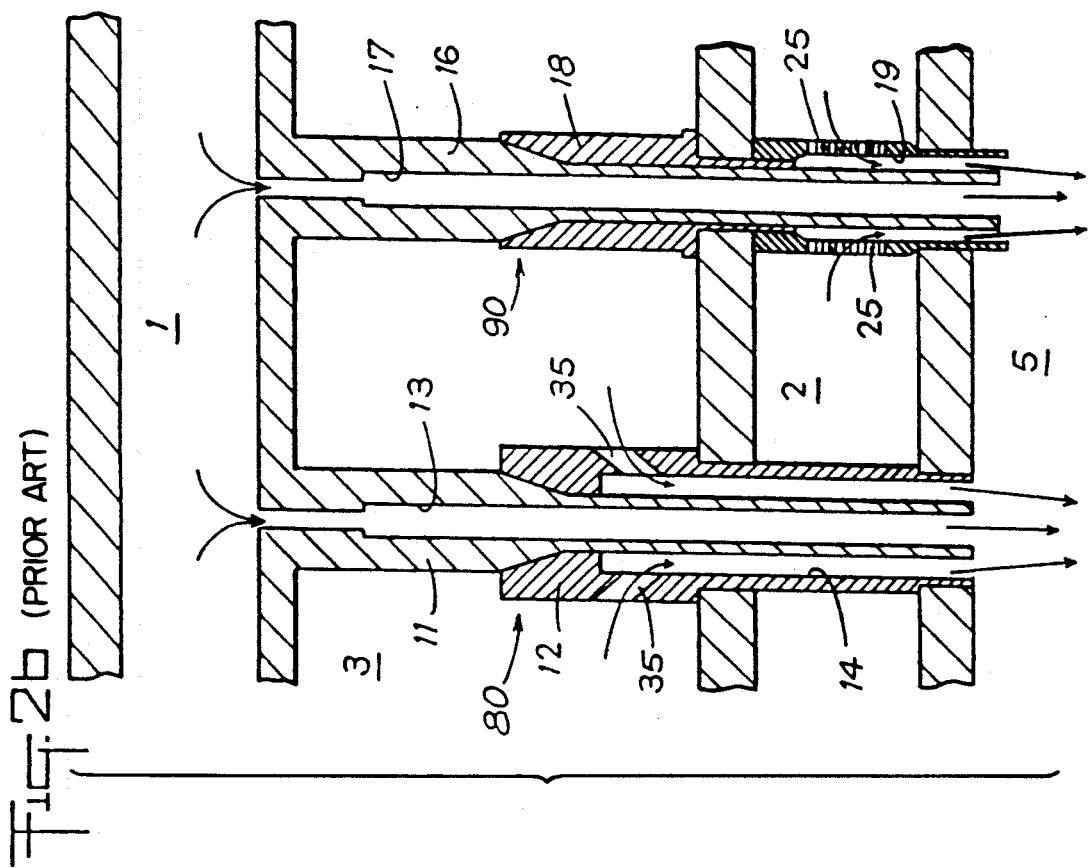
FIG. 2a and 2b show schematically an axial cross-sectional view of prior art injectors, FIG. 2b showing a particular type of injector fitted to the so-called "integrated flux" motors.
Figure 2A:
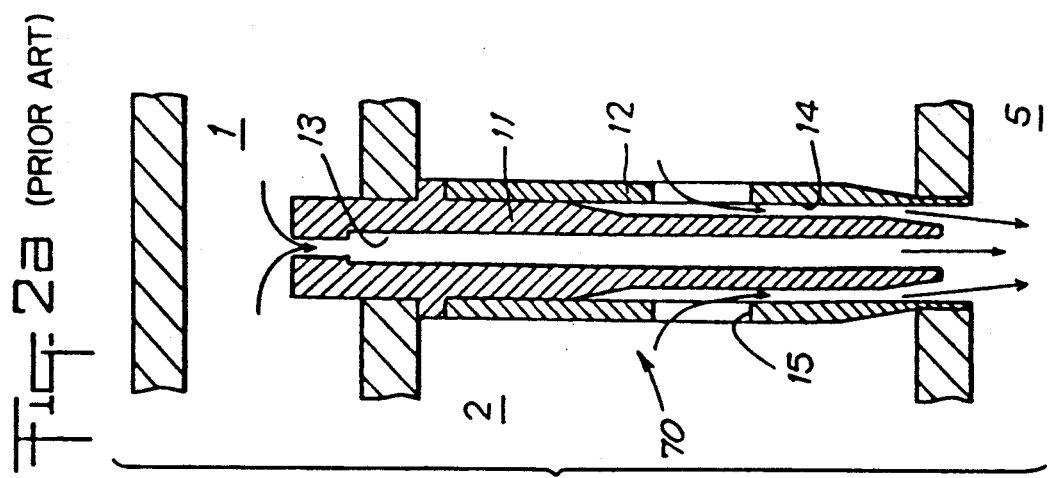

According to a first embodiment, the tapping off device 140 includes a simple tapping off tube 116 which originates from the combustion chamber 105 while penetrating slightly within said chamber 105 (FIG. 1a) or simply being flush with the injection plate forming the base wall 150 of the chamber (FIG. 1). The tapping off tube 116, which defines a channel 117, has its end opposite the combustion chamber 105 giving onto a hot gas tapping off chamber 106. A calibrated hole 141 is located at the outlet of the tapping off tube 116, to provide regulation of the hot gas flow.

In this first embodiment, the tapping off tube is cooled by the propellant located in the cavity 102 traversed by the tapping off tube 116.

The tapping off tube 116 can be made of a material capable of withstanding high temperatures, such as a thermo-structural composite material. The porosity of such a composite is not a problem insofar as the propellant contained in the chamber 102 is compatible with the chemical composition of the hot gases. Besides, the pressure of the propellant is necessarily greater than that of the hot gases.

FIG. 3 shows an embodiment similar to that of FIG. 1, but in which radical calibrated holes 145 are machined in the wall of the tapping off tube 116. These holes 145 serve to cool the hot gases by predetermined amount, by injection of cold propellant.

According to another embodiment, shown in FIG. 4, the said tapping off device 140 has two coaxial tubes 116 and 118, of which one end is flush with the injection plate forming part of the wall 150 of the combustion chamber 105. The external tube 118 is perforated with holes 125 so as to allow an inflow of the propellant that is contained within the cavity 102, into the annular space 119 defined between the two coaxial tubes 116, 118, in order to create a flow of a propellant running along at least a part of the height of the tapping off device 140 forming a particular injection element. The flow of propellant circulating in the annular space 119 is colder than the gas in the combustion chamber, and mixes with the latter in the tapping off zone. The circulation of cooling propellant between the inner tube 116 forming the tapping off pipe proper and the external tube 118 forming the cooling tube occurs in a liquid phase, or in a supercritical phase in the case of hydrogen.

As shown in FIGS. 5, 6, 8 and 9, the tapping off device 140, instead of being flush, can extend through the opening 152 of the wall 150 of the combustion chamber to penetrate within the combustion chamber 105. Such a projection of the tapping off device(s) 140 into the combustion chamber 105 can effectively provide baffles, making it possible to modify the acoustic frequencies of the chamber 105 and to reduce the risks of a high frequency combustion fluctuation. The projection of the tapping off devices 140 inside the chamber 105 thus provides for a reduction in the recirculation or the velocity fields that are detrimental to a good combustion, and further allows selection of the suitable tapping off points so as not to reduce the combustion efficiency. It should be noted that the projection of the tapping off devices 140 inside the combustion chamber 105 does not introduce risks for the integrity of the said devices 140, which are of the Pitot type, since the latter are in contact with a flow of cooling propellant through the annular space 119.

Figure 6:
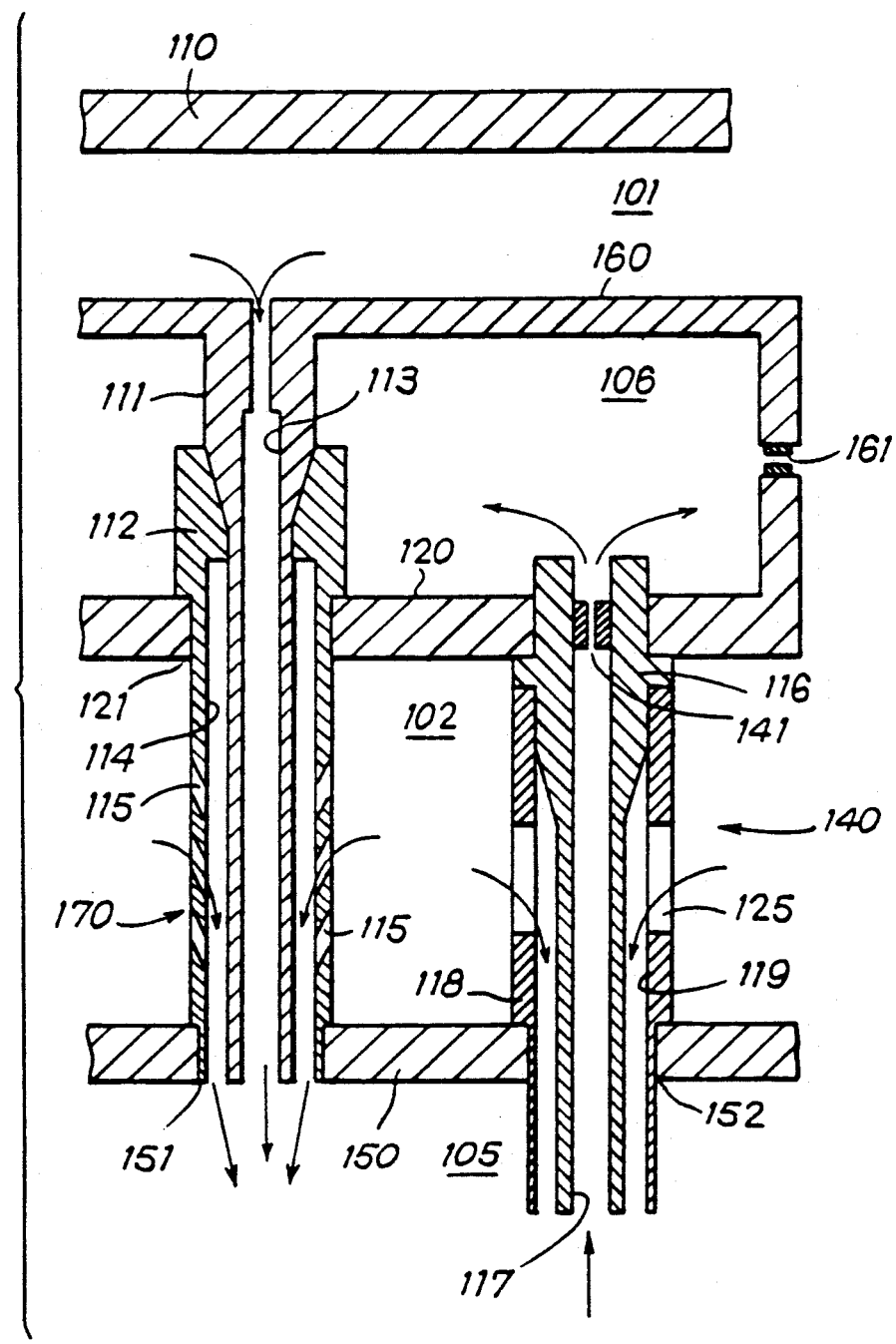

In the embodiment shown in FIG. 6, the two tubes 116, 118 each penetrate into the combustion chamber by the same amount.

However, as is shown in FIGS. 8 and 9, the external tubular element 118 can penetrate inside the combustion chamber 105 by a distance slightly greater than the internal tubular element 116. This configuration enhances the mixing of a part of the cooling propellant that is injected in the annular part 119 with the flux of hot gases tapped off at the end of the central channel 117 of the tube 116, and which rises along the tapping off device.

Figure 5:
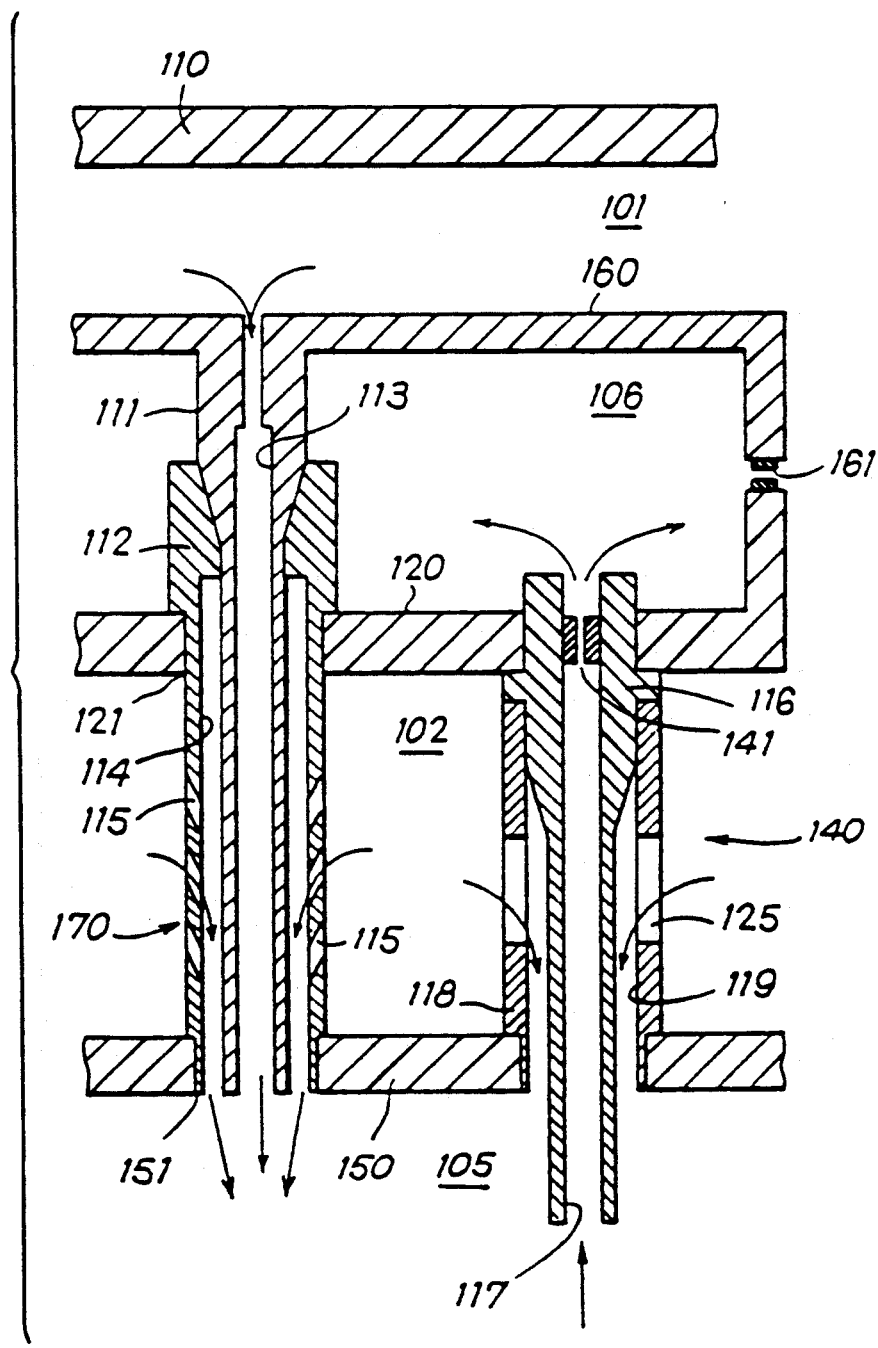

In the embodiment of FIG. 5, only the internal tube 116 forming the tapping off tube itself penetrates into the combustion chamber 105. This configuration avoids tapping off too much cooling propellant. In this embodiment, a film of cooling propellant is formed on the external part of the internal tapping off tube 116 that penetrates into the combustion chamber 105, so contributing towards the protection of the said internal tube 116.

In the embodiments of FIGS. 5, 6, 8 and 9, the end of the inner tube 116 opposite the combustion chamber 105, gives onto a hot gas tapping off cavity 106. The hot gas and coolant mixture goes through the inner tube 116 from the combustion chamber 105 up to the hot gas tapping off chamber 106.

FIG. 8 shows a specific embodiment of a tapping off device 140 in which the inner tube 116 is perforated with holes 145 located at the same level as the openings 125 formed in the lateral wall of the external tube 118. In this case, the cooling propellant is thus injected directly into the central channel of the injection device 140. The holes 145 shown in FIG. 8 therefore have the same role as the holes 145 in FIG. 3, and serve for cooling the hot gases by a predetermined amount, by injection of cold propellant.

FIG. 9 shows a third embodiment of a tapping off device 140 according to the present invention, wherein holes 126 are provided in a wall 120 separating the coolant injection cavity 102 from the hot gas tapping off cavity 106, so as to provide a communication means between the two said cavities. This communication means contributes to provide cooling of the hot gases by a predetermined amount, by injection of cold propellant.

In the different embodiments of FIGS. 1, and 3 to 11 similar elements bear the same reference numerals, and so elements already described with reference to FIG. 1 will not be described again.

As can be seen in FIGS. 1 and 3 to 9, it is possible to provide, for each of the embodiments just described, a nozzle 141 or a sonic jet incorporated in the inner tube 116 of the tapping off device 140, in order to individually adjust and calibrate the gas flow tapped off for each device 140. Alternatively, there can be added a nozzle 161 or sonic jet at the outlet of the tapping off cavity 106 so as to provide an overall adjustment and calibration irrespective of the number of tapping off devices 140 (FIG. 1 and 3 to 7).

The calibration devices 141,161 can serve not only to regulate the combustion gas flow, but also to uncouple the operation of the combustion chamber from that of the devices utilizing the gas tapped off.

A characteristic feature of the device according to the present invention, is in the cooling of hot gases generated by the combustion of two propellants tapped from the combustion chamber 105, by means of a mixture of one of the two propellants. Insofar as the gases burnt in the combustion chamber are generally of the reducing type, it is preferable to mix the tapped off gases with a reducing propellant. The ratio of hot gas tapped off to the flow of mixed propellant provides a means for adjusting the temperature of the gas at the output of the device according to the invention. Should the flow of propellant fed into the central channel 117, by its end located in the combustion chamber, be insufficient for cooling the gas to the desired temperature, it is possible to create an extra mixing of the reducing propellant and the hot gases. This mixing can be performed at the level of the internal tube by means of a series of holes (FIG 8) or by putting the reducing propellant cavity 102 into communication with the hot gas cavity (FIG. 9).

It should be noted that in all the cases considered, the reducing propellant film serves primarily to cool each internal tube 116, ensuring maximum mechanical resistance to the latter.

FIG. 7 shows an embodiment in which a baffle 180 surrounds an inlet of the tapping off pipe 116. This baffle 180 is unitary with the injection plate 150. The implementation of a baffle 180 around a tapping off device 140 serves to reduce the tapping off of partially burnt gases originating from neighbouring injectors 170.

FIG. 7 shows a single tube type tapping off device 140, but the baffles 180 can obviously be provided around tapping off devices 140 having two coaxial tubes of the type shown in FIGS. 4 to 6 or 8,9.

FIG. 10 shows yet another embodiment of the tapping off device according to the invention. According to this embodiment, an external metallic tube 118 forms a spacer between the injection plate 150 on the one hand and the wall 120 forming a partition between the chamber 102 containing a propellant and the chamber 106 receiving the gases tapped off by the tapping off device 140 on the other. The external tube 119 forming the spacer is welded onto both the injection plate 150 and the wall 120. An internal tube 116 made of a thermo structural composite material and forming the tapping off tube proper presses against a collar 193 on the face of the plate 150 that is turned toward the combustion chamber 105, and is held in position by a fixing ring 192 supporting a washer 191 which is itself pressed against the face of the wall 120 situated on the side of the chamber 106.

Radial calibrated holes 125 are provided on the external tube 118 and give onto an annular space 119 to cool the internal tube 116 due to the tube porosity.

In the present description, a tapping off device 140 was described in association with a known injector 170. In an injector head containing several injector 170, such tapping off device 140 can be inserted between the known injectors 170, but it is obviously not essential that their number be equal to that of the injectors.

Figure 12:
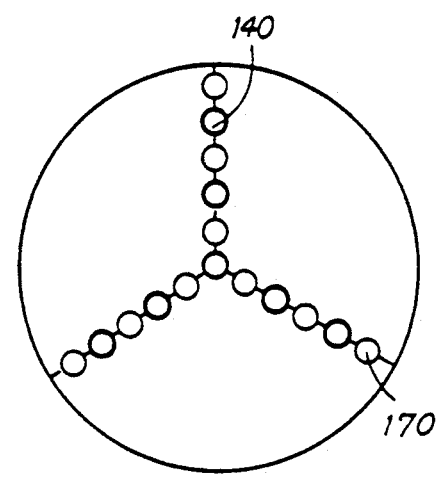
FIGS. 12 to 14 show front views of an injector head fitted with tapping off devices according to the invention, with three different arrangements for the tapping off devices.
Figure 13:
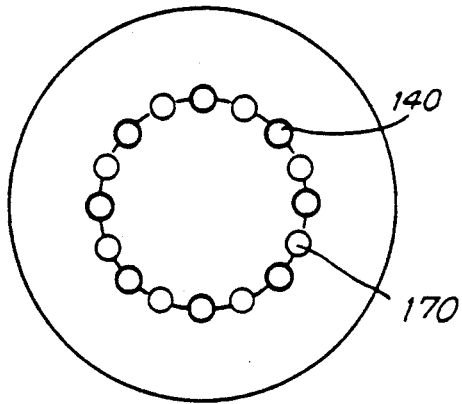
Figure 14:
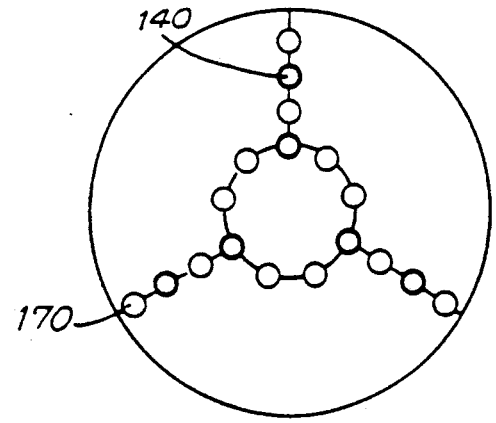

FIGS. 12, 13 and 14 show three examples of configurations for arranging tapping off devices among injectors 170. It shall be noted that the pattern formed thereby always has a regular geometry. Moreover, injectors 170 neighbouring the tapping off devices are preferably fitted with calibrated holes (not shown) to facilitate tapping off and to ensure optimum combustion conditions.

Figure 11:
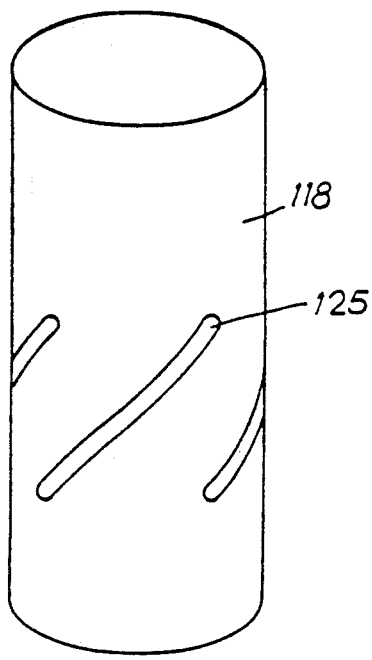
FIG. 11 is a schematic side view of the external tube for a tapping off device according to a specific embodiment.

Shown in FIG. 11, the holes 125 for communication between the chamber 102 containing the reducing propellant and the annular space 119 of the gas tapping off devices 140 can have a special shape, eg. helical shape, so as to provide a flow for the propellant film within the annular space 119, providing uniform cooling over the circumference of the coaxial tubes 116,118. It is also preferable to give a specific shape and dimension to these holes 125 so as to provide them with a calibration function allowing temperature adjustment of the gases tapped off. The holes 126 of FIG. 9 can likewise serve for calibration and adjustment to help regulate the temperature of the gases tapped off.

In the embodiment of FIG. 9, it is possible to fit a gas homogenisation device inside the chamber 106 receiving the gases tapped off from the combustion chamber 105, to ensure a suitable mixture between the gases tapped off and the coolant, and thus obtained a uniform temperature. Such a device comprises an obstacle to the flow and can be formed by gates, baffles, rings or the like, and creates a turbulence in the flow. The mixing device can be placed in the tapping offf cavity 106 or, alternatively, at the outlet of the latter downstream of the calibration device 161.

What is claimed is:

1. Device for tapping off hot gases from a combustion chamber into which a plurality of injectors mounted in an injection plate open, each injector having at least an inlet channel for a propellant, the injectors delivering at least two propellants coming from two different cavities, wherein said device includes a tap-off means to convey the gases tapped from the combustion chamber into a third cavity which is equipped at its output with a first nozzle hole having a predetermined diameter selected to achieve a desired gas flow out of said third cavity and wherein said tap-off means includes a cooling system running off one of said propellants and wherein said tap-off means is formed by at least one tubular element having, in the region of its end opposite the combustion chamber and opening in said third cavity, a second nozzle hole having a predetermined diameter selected to achieve a desired gas flow of the gases tapped off out of the combustion chamber.

2. Device as claimed in claim 1, wherein said cooling system of said tap-off means comprises a contact between the external face of the lateral wall of said tubular element with one of said cold propellants.

3. Device as claimed in claim 1, wherein said cooling system of said tap-off means includes means for putting into circulation one of said propellants over a part of the length of said tap-off means.

4. Device as claimed in claim 3, wherein said tap-off means includes two coaxial tubular elements, the innermost one of which having, in the region of its end opposite the combustion chamber, said second nozzle hole and serving as the tap-off tube proper, and the outermost tube constituting a cooling tube.

5. Device as claimed in claim 4, wherein the external tubular element constituting a cooling means opens into the combustion chamber whilst being flush with the injection plate.

6. Device as claimed in claim 4, wherein said external tubular element of said tap-off means is provided with openings to allow passage therethrough of cooling propellant into an annular space defined by said two coaxial tubular elements.

7. Device as claimed in claim 6 wherein said annular space defined by said two coaxial tubular elements opens into said combustion chamber.

8. Device as claimed in claim 6 wherein said internal tubular element is provided with holes; opposite said openings of said external tubular element, intended for increasing the flow of cooling propellant mixed with the gases tapped in order to reduce the temperature of the gases taped off.

9. Device as claimed in claim 6, wherein only said internal tubular element penetrates by a certain length inside said combustion chamber, so as to limit the tapping off of too large a quantity of cooling propellant.

10. Device as claimed in claim 6, wherein said external tubular element penetrates inside said combustion chamber over a distance slightly exceeding that of said internal tubular element, so as to enhance the mixture of cooling propellant with the flux of hot gases rising through the tap-off means.

11. Device as claimed in claim 1, wherein the lateral wall or said tubular element forming said tap-off means is perforated with radial, calibrated hoes for cooling hot gases circulating in the tap-off means by a predetermined value, by injection, into the flow of gases tapped off, of a flow of cold propellant contacting the outer face of the lateral wall of said tubular element.

12. Device as claimed in claim 1 wherein the end of said tap-off means penetrate into the combustion chamber.

13. Device as claimed in claim 1, wherein the tap-off means opens into the combustion chamber whilst being flush with the injection plate.

14. Device as claimed in claim 1, wherein said tap-off means is made of a material that is resistant to high temperatures, such as a thermo-structural composite material the porosity of which permits a cooling of the tap-off means and the hot gases.

15. Device as claimed in claim 14, wherein the tap-off means is made of a porous composite material and comprises an annular chamber communicating via radial calibrated holes with a source of cooling fluid constituted by one of said cold propellant.

16. Device as claimed in claims 1, characterized in that it further includes a baffle that surrounds the inlet of said tap-off means on the combustion chamber side and is unitary with the injection plate, thus limiting the tapping off of incompletely burnt gases.

17. Injector head for a combustion chamber, comprising first and second cavities, respectively containing first and second propellants, a plurality of injectors mounted in an injection plate, each injector having at least an inlet channel for one of said propellants, said injectors opening into said combustion chamber, and comprising a plurality of tap-off means to convey the gases tapped from the combustion chamber into a third cavity which is equipped at its output with a first nozzle hole having a predetermined diameter selected to achieve a desired gas flow out of said third cavity wherein each of said tap-off means includes a cooling system running off one of said propellants and each said tap-off means is formed by at least one tubular element having, in the region of its end opposite the combustion chamber and opening in said third cavity, a second nozzle hole having a predetermined diameter selected to achieve a desired gas flow out of the combustion chamber, and wherein said plurality of tap-off means are arranged among said injectors according to a regular geometrical pattern.

18. Injector head as claimed in claim 17, further comprising passage holes for coolant propellant provided in the wall separating the cavity containing said propellant from the cavity into which are conveyed the gases tapped off.

19. Injector head as claimed in claim 17, wherein injectors located in proximity to a tap-off device are fitted with calibrated holes to facilitate gas tap off and to ensure satisfactory combustion conditions.

20. Injector head for a combustion chamber as claimed in claim 17, wherein said regular geometrical pattern is a circle.

21. Injector head for a combustion chamber as claimed in claim 17, wherein said regular geometrical pattern is a star.

* * * * *